United States Patent

Mellor

[15] 3,638,030
[45] Jan. 25, 1972

[54] WINDSCREEN WIPING SYSTEMS FOR ROAD VEHICLES

[72] Inventor: Walter Mellor, Sutton Coldfield, England
[73] Assignee: Joseph Lucas (Industries) Limited, Birmingham, England
[22] Filed: Feb. 5, 1970
[21] Appl. No.: 8,995

[30] Foreign Application Priority Data
Feb. 19, 1969 Great Britain ................. 8,891/69

[52] U.S. Cl. ........................... 307/10, 15/250.02
[51] Int. Cl. ............................................ H02g 3/00
[58] Field of Search ........... 15/250.02; 318/DIG. 2; 307/10

[56] References Cited

UNITED STATES PATENTS 3,015,119   1/1962   Lamaudiere ................. 15/250.02
3,383,730   5/1968   Lamaudiere ................. 15/250.02

Primary Examiner—Herman J. Hohauser
Attorney—Holman & Stern

[57] ABSTRACT

A windscreen wiping system for a road vehicle includes a windscreen wiper motor, a windscreen washer motor, a manually operable switch for controlling the wiper motor and a parking switch operable in synchronism with the wiper motor and serving when the manually operable switch is in its off position to complete a circuit to the wiper motor until the wipers reach a parking position. The washer motor is connected in the circuit in such a way that when a switch in series with the washer motor is closed, the circuit to the washer motor is completed each time the parking switch moves to its parking position.

2 Claims, 1 Drawing Figure

PATENTED JAN 25 1972  3,638,030
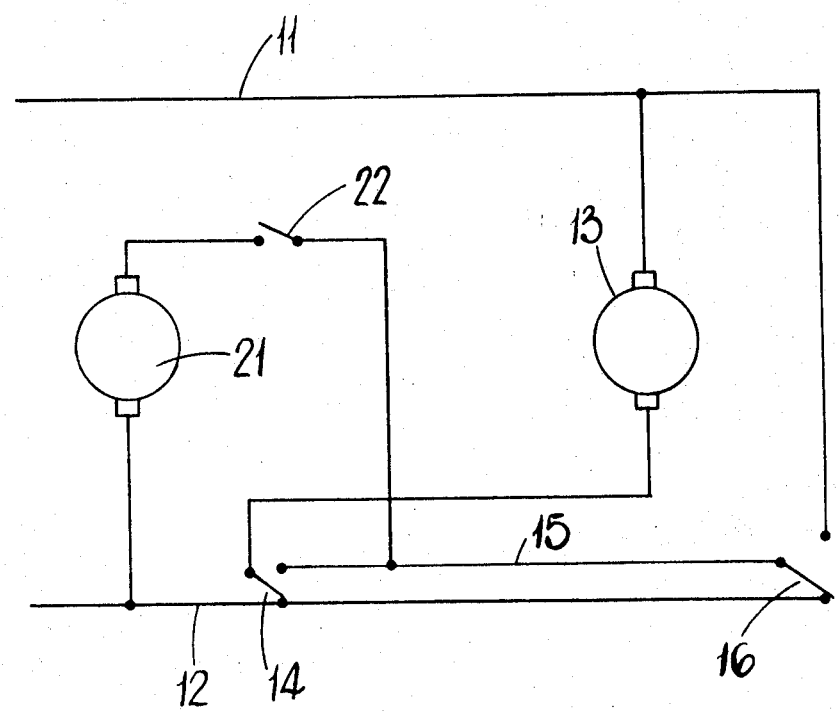
INVENTOR
Walter Mellor
Holman, Glascock, Downing & Seebold
ATTORNEYS

WINDSCREEN WIPING SYSTEMS FOR ROAD VEHICLES

This invention relates to windscreen wiping systems for road vehicles, of the kind including a wiper motor, a manually operable switch for controlling the motor, and a parking switch operable in synchronism with the motor and serving when the manually operable switch is moved to its off position to complete a circuit to the wiper motor until the wipers reach a parking position.

The invention resides in a system of the kind specified incorporating also a washer motor which when operated causes liquid to be supplied to the windscreen of a road vehicle, the washer motor being connected in the circuit in such a way that when a switch in series with the washer motor is closed, the circuit to the washer motor is completed each time the parking switch moves to its parking position.

The accompanying drawing is a circuit diagram illustrating one example of the invention.

Referring to the drawing, there are provided negative and positive supply lines 11, 12 which in use are connected to the vehicle battery. Connected to the line 11 is one side of a permanent magnet windscreen wiper motor 13, the other side of which is connected to the movable contact 14 of a manually operable switch having an on position illustrated in which the contact 14 connects the motor 13 on the line 12, and an off position in which the contact 14 connects the motor 13 to a further line 15. The line 15 is connected to the movable contact 16 of a parking switch which is operable by the motor 13, the arrangement being such that for the greater part of each cycle of operation of the motor 13 the contact 16 connects the line 15 to the line 12, but once in each cycle at a point when the windscreen wipers are in a parking position, the contact 16 moves to its alternative position in which it connects the line 15 to the line 11.

The arrangement thus far described is known, and in operation with the contact 14 in its on position, a circuit is completed to a permanent magnet motor 13, which operates the wipers. Movements of the contact 16 between its two positions play no part in the operation of the circuit at this stage. When it is desired to stop wiping the windscreen the contact 14 is moved to its off position, but assuming the wipers are not in their parking position, a circuit is still completed to the motor 13 through the contacts 16 and 14. As soon as the wipers reach their parking position, the contact 16 moves to its alternative position, breaking the circuit to motor 13, and at the same time short-circuiting the motor 13, so that the wipers stop quickly.

In order to incorporate a windscreen washing system in the system thus far described, all that is necessary is to connect a permanent magnet motor 21 in series with a manually operable switch 22 between the line 12 and the line 15. The motor 21 operates a pump for supplying cleansing liquid to the windscreen, and the arrangement is such that when the windscreen wiper motor 13 is operating and the switch 22 is closed, the motor 21 will be energized each time the contact 16 moves to its alternative position in which it connects the line 15 to the line 11. Thus, water will be supplied to the windscreen in squirts synchronized with the movements of the windscreen wipers. The extreme simplicity of the system compares very favorably with many other far more complicated arrangements which have been proposed in the past for incorporating automatic windscreen washers in a windscreen wiping system.

In a modification suitable for wound field wiper motor systems, the parking switch when closed, energizes a relay the contact of which completes a circuit to the wiper motor. When the wipers reach their parking position, the parking switch opens, the relay is deenergized and the relay contact moves to its alternative position, completing a circuit through an on-off switch to the washer motor.

Having thus described my invention what I claim as new and desire to secure by Letters Patent is:

1. A windscreen wiping system of the kind including a wiper motor, a manually operable switch for controlling the motor, and a parking switch operable in synchronism with the motor and serving when the manually operable switch is moved to its off position to complete a circuit to the wiper motor until the wipers reach a parking position, said system including also a washer motor which when operated causes liquid to be supplied to the windscreen of a road vehicle, a control switch for said washer motor, and means connecting the washer motor in the circuit in such a way that when said control switch is closed, the circuit to the washer motor is completed each time the parking switch moves to its parking position.

2. A windscreen wiping and washing device for a road vehicle, comprising in combination first and second supply lines for connection to the battery of said vehicle, a windscreen wiper motor, means connecting one side of said windscreen wiper motor to said first supply line, a manually operable switch for controlling said windscreen wiper motor, said manually operable switch having a movable contact connected to the other side of said motor and movable between an on position in which it connects the other side of said motor to said second supply line, and an off position in which it connects said other side of said motor to a third supply line, a parking switch driven by said windscreen wiper motor, said parking switch having a movable contact connected to said third supply line and engaging the first supply line until the wipers reach a parking position, at which point the parking switch couples the third supply line to the first supply line, and a windscreen washer motor connected in series with a manually operable switch between the second and third supply lines.

* * * * *